(12) United States Patent
Tani et al.

(10) Patent No.: US 11,264,617 B2
(45) Date of Patent: Mar. 1, 2022

(54) ALL-SOLID-STATE SECONDARY BATTERY

(71) Applicant: FURUKAWA ELECTRIC CO., LTD., Tokyo (JP)

(72) Inventors: Toshio Tani, Tokyo (JP); Masanobu Aragaki, Tokyo (JP); Isamu Futaba, Tokyo (JP); Toshiya Hikami, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 933 days.

(21) Appl. No.: 14/865,619

(22) Filed: Sep. 25, 2015

(65) Prior Publication Data

US 2016/0197351 A1 Jul. 7, 2016

Related U.S. Application Data

(63) Continuation of application No. PCT/JP2014/056448, filed on Mar. 12, 2014.

(30) Foreign Application Priority Data

Mar. 26, 2013 (JP) .............................. JP2013-063697

(51) Int. Cl.
*H01M 4/66* (2006.01)
*H01M 10/0562* (2010.01)
(Continued)

(52) U.S. Cl.
CPC ........... *H01M 4/628* (2013.01); *H01M 4/136* (2013.01); *H01M 4/58* (2013.01); *H01M 4/661* (2013.01);
(Continued)

(58) Field of Classification Search
None
See application file for complete search history.

(56) References Cited

U.S. PATENT DOCUMENTS

| 6,051,340 A * | 4/2000 | Kawakami | ............ H01M 4/134 |
| | | | 429/231.95 |
| 2005/0118504 A1* | 6/2005 | Honda | ................ H01M 4/0426 |
| | | | 429/218.1 |

(Continued)

FOREIGN PATENT DOCUMENTS

| JP | 2001-68150 A | 3/2001 |
| JP | 3433173 B2 | 8/2003 |

(Continued)

OTHER PUBLICATIONS

Nagase (JP 2012049023 A)—machine translation.*

(Continued)

*Primary Examiner* — Haixia Zhang
(74) *Attorney, Agent, or Firm* — Hauptman Ham, LLP

(57) ABSTRACT

An all-solid-state secondary battery, wherein: an anode current collector that contains copper or copper alloy; a cathode current collector comprising aluminum, aluminum alloy or stainless steel, provided opposite to the anode current collector; an anode active material layer formed there between from the anode current collector side on the surface of the anode current collector; a solid electrolyte layer comprising a sulfide solid electrolyte that contains a monovalent or divalent metal and sulfur; and a cathode active material layer formed on the surface of the cathode current collector are layered successively, is used. A sulfidation resistant layer is formed on the surface of the anode current collector on which the anode active material layer is formed. Or, the surface of the anode current collector on which the anode active material layer is formed has a compressive strength of 1250 to 3000 MPa.

3 Claims, 3 Drawing Sheets

(51) Int. Cl.
*H01M 4/136* (2010.01)
*H01M 4/58* (2010.01)
*H01M 4/62* (2006.01)
*H01M 10/052* (2010.01)
*H01M 10/0585* (2010.01)

(52) U.S. Cl.
CPC .......... *H01M 4/667* (2013.01); *H01M 4/669* (2013.01); *H01M 10/052* (2013.01); *H01M 10/0562* (2013.01); *H01M 10/0585* (2013.01); *H01M 2300/0068* (2013.01)

(56) References Cited

U.S. PATENT DOCUMENTS

| | | | |
|---|---|---|---|
| 2006/0199078 A1* | 9/2006 | Koshina | H01M 4/5815 429/231.95 |
| 2007/0054188 A1* | 3/2007 | Miller | H01M 4/581 429/218.1 |
| 2008/0292963 A1 | 11/2008 | Sato et al. | |
| 2010/0330425 A1 | 12/2010 | Lopatin et al. | |
| 2011/0129723 A1 | 6/2011 | Tsuchida | |
| 2014/0318973 A1* | 10/2014 | Kohiki | C25D 1/04 205/50 |

FOREIGN PATENT DOCUMENTS

| | | |
|---|---|---|
| JP | 2005-353309 A | 12/2005 |
| JP | 2006-202636 A | 8/2006 |
| JP | 2007-172963 A | 7/2007 |
| JP | 2008-117655 A | 5/2008 |
| JP | 2009-4363 A | 1/2009 |
| JP | 2009-181901 A | 8/2009 |
| JP | 2010-250978 A | 11/2010 |
| JP | 2012-49023 A | 3/2012 |
| JP | 2012-199234 A | 10/2012 |
| JP | 2012-532419 A | 12/2012 |
| JP | 2013-30440 A | 2/2013 |
| KR | 10-2009-0086462 A | 8/2009 |
| TW | 200843166 A | 11/2008 |
| WO | 2006/132339 A1 | 12/2006 |
| WO | 2008/102712 A1 | 8/2008 |

OTHER PUBLICATIONS

Office Action in KR Application No. 10-2015-7018972, dated Sep. 29, 2017. 15pp.
Office Action in KR Application No. 10-2015-7018972, dated Jan. 10, 2017.
International Search Report for PCT/JP2014/056448 dated Jun. 24, 2014.
Office Action dated Jun. 23, 2015, corresponding to Taiwanese patent application No. 103110128.

* cited by examiner

ALL-SOLID-STATE SECONDARY BATTERY

RELATED APPLICATIONS

The present application is a continuation of International Application Number PCT/JP2014/056448, filed Mar. 12, 2014, which claims priority from Japanese Application Number 2013-063697, filed Mar. 26, 2013, the disclosures of which application are hereby incorporated by reference herein in their entirety.

TECHNICAL FIELD

The present invention relates to a secondary battery that is installed in electronic equipments and satellites. In particular, it relates to a bulk-type all-solid-state secondary battery that comprises solid electrolytes as its component.

BACKGROUND ART

Conventionally, lithium ion secondary batteries that utilize Li ion as a rocking chair-type charge-discharge mobile ion between the cathode and anode have been widely used as secondary batteries. This is because it utilizes organic electrolytes, wherein electrolytes are dissolved in non-aqueous solvents, and Li light elements, and provides relatively higher specific energy compared to conventional lead storage batteries and nickel-cadmium batteries.

However, because it utilizes organic electrolytes that use flammable solvents, there is a problem of short circuiting, as well as ignition and combustion accidents. For this reason, the use of incombustible ionic liquids, gel-type electrolytes, and polymer-type electrolytes as the electrolyte solution, have been considered (Patent Document 1). The most ideal form is an all-solid-type, which utilizes inorganic solids as the electrolyte, and provides a secondary battery that is, not only safe, but stable and reliable, as well. In order to obtain large capacity (specific energy), it is also possible to adopt a layered structure. Further, unlike conventional electrolyte solutions, the process of desolvation of solvated Li ion is unnecessary. Since the transfer of Li ion alone through the ion conductor solid electrolyte is necessary, and other unnecessary side reactions do not occur, the cycle life can be widely extended.

Although until recently, the ion conductivity of the solid electrolyte, which is the key to the realization of the all-solid-state secondary battery, was far from that of organic electrolyte solutions, in recent years, ion conductors that show similar or higher levels of ion conductivities than those of electrolyte solutions have been discovered, and studies on practical application of solid electrolyte secondary batteries using these have begun (Patent Document 2, Patent Document 3).

However, because solid electrolyte materials that show high ion conductivity are sulfide-type materials that contain sulfur, preparation of its handling environment is required, and there is the fear of corrosion of other materials composing the battery. In the component of the all-solid-state secondary battery that use sulfide solid electrolyte, which is said to be able to realize high stability, reliability, and safety, there was a fear of corrosion of other components by the sulfide solid electrolyte. In particular, there was a fear that the anode current collector copper foil, which has widely been used in conventional organic electrolyte solution Li ion secondary batteries, cannot be used, or would undergo corrosion if it were to be used. For this reason, problems such as the decrease in specific capacity of the battery due to the limitation of anode active materials and the increase in cost caused by using expensive current collector materials existed.

Further, solid electrolyte materials that show excellent ion conductivity are powdery, and must be pressed under pressure to form ion conductors with conductivity. Sulfide solid electrolytes may be press-molded under normal temperature, but in general, they are integrally molded with a current collector. However, conventional current collector copper foils have insufficient press resistance, and could lead to deformation, as well as rupture.

On the other hand, in an all-solid-state battery, generally, lithium cobaltate ($LiCoO_2$, LCO) is used as the cathode active material, and carbon materials such as graphite are used as anode active materials. However, there was a problem in that LCO shows high contact interface resistance barrier with solid electrolytes while graphite anodes show low specific capacity. Further, alloy anodes such as Si, which show high capacity, show intensive cycle deterioration due to large volume change with charge-discharge, and could not be adopted.

RELATED ART

Patent Documents

Patent Document 1: WO2006/132339
Patent Document 2: Japanese Patent No. 3433173
Patent Document 3: JP-A-2013-30440

SUMMARY

The present invention was made in order to solve the above-described conventional problems, and its object is to provide an all-solid-state secondary battery that shows excellent safety, stability, and reliability, which solves concerns such as anode current collector corrosion and copper foil fracture.

In order to achieve the above-described object, the following inventions are provided:

(1) An all-solid-state secondary battery, which comprises: an anode current collector that contains copper or copper alloy; a cathode current collector comprising aluminum, aluminum alloy or stainless steel, provided opposite to the anode current collector; an anode active material layer formed there between from the anode current collector side on the surface of the anode current collector; a solid electrolyte layer comprising a sulfide solid electrolyte that contains a monovalent or divalent metal and sulfur; and a cathode active material layer formed on the surface of the cathode current collector, layered successively, which further comprises a sulfidation resistant layer formed on the surface of the anode current collector on which the anode active material layer is formed, wherein the sulfidation resistant layer is a copper sulfide layer that contains copper sulfide or a copper oxide layer that contains copper oxide.

(2) The all-solid-state secondary battery according to (1), wherein the copper sulfide layer or the copper oxide layer has a thickness of 0.01 to 1 µm.

(3) The all-solid-state secondary battery according to (1), wherein the copper oxide layer comprises a first layer on the anode current collector side, which mainly contains cuprous oxide, and a second layer on the surface layer side, which mainly contains cupric oxide.

(4) An all-solid-state secondary battery, which comprises: an anode current collector that contains copper or copper alloy; a cathode current collector comprising aluminum, aluminum alloy or stainless steel, provided opposite to the anode current collector; an anode active material layer formed there between from the anode current collector side on the surface of the anode current collector; a solid electrolyte layer comprising a sulfide solid electrolyte that contains a monovalent or divalent metal and sulfur; and a cathode active material layer formed on the surface of the cathode current collector, layered successively, which further comprises a sulfidation resistant layer formed on the surface of the anode current collector on which the anode active material layer is formed, wherein the sulfidation resistant layer is a sulfidation resistant metal layer that contains at least one element selected from nickel, zinc, or tin.

(5) The all-solid-state secondary battery according to (4), wherein the sulfidation resistant metal layer has a thickness of 0.01 to 5 µm.

(6) The all-solid-state secondary battery according to (4), wherein the zinc or tin in the sulfidation resistant metal layer undergoes diffusion alloying with the copper in the anode current collector to form a diffusion alloying layer.

(7) The all-solid-state secondary battery according to (6), wherein a nickel layer is further formed on top of the diffusion alloying layer.

(8) An anode current collector used in an all-solid-state secondary battery, which comprises a substrate and the sulfidation resistant metal layer described in (4) layered thereon.

(9) An anode for all-solid-state secondary battery, which utilizes the anode current collector of (8).

(10) An anode for all-solid-state secondary battery, which comprises the anode current collector according to (8) and an anode active material layer that contains a sulfide solid electrolyte layered thereon.

(11) An all-solid-state secondary battery, which comprises: an anode current collector that contains copper or copper alloy; a cathode current collector comprising aluminum, aluminum alloy or stainless steel provided opposite to the anode current collector; an anode active material layer formed there between from the anode current collector side on the surface of the anode current collector; a solid electrolyte layer comprising a sulfide solid electrolyte that contains a monovalent or divalent metal and sulfur; and a cathode active material layer formed on the surface of the cathode current collector, layered successively, wherein the surface of the anode current collector on which the anode active material layer is formed has a compressive strength of 1250 to 3000 MPa.

(12) The all-solid-state secondary battery according to (11), wherein the surface of the anode current collector on which the anode active material layer is formed has a compressive elastic modulus of 60 to 125 GPa.

(13) The all-solid-state secondary battery according to (11), which further comprises a copper electrodeposition layer that contains molybdenum or tungsten on the surface of the anode current collector, wherein the copper electrodeposition layer has a thickness of 0.1 to 2.5 µm.

(14) The all-solid-state secondary battery according to (11), wherein one of sulfur, $M_8Mo_6X_{8-y}$ (M=metal, X=S, Se, Te, $0 \leq x \leq 4.0$, $0 \leq y \leq 0.2$), or $Mo_6S_8$, ($0 \leq x \leq 0.2$) is used as a cathode active material contained in the cathode active material layer.

(15) The all-solid-state secondary battery according to (11), wherein the anode active material contained in the anode active material layer is $M_xP_y$ ($0.9 \leq x$, $y \leq 10$, M=Si, Sn, In, Al, Zn).

(16) The all-solid-state secondary battery according to (11), wherein the anode active material layer contains the sulfide solid electrolyte.

Effect of the Invention

An all-solid-state secondary battery that shows excellent safety, stability, and reliability, which solves concerns such as anode current collector corrosion and copper foil fracture, is provided.

DESCRIPTION OF SOME EMBODIMENTS

First Embodiment

Copper Sulfide Layer

Figure 1:
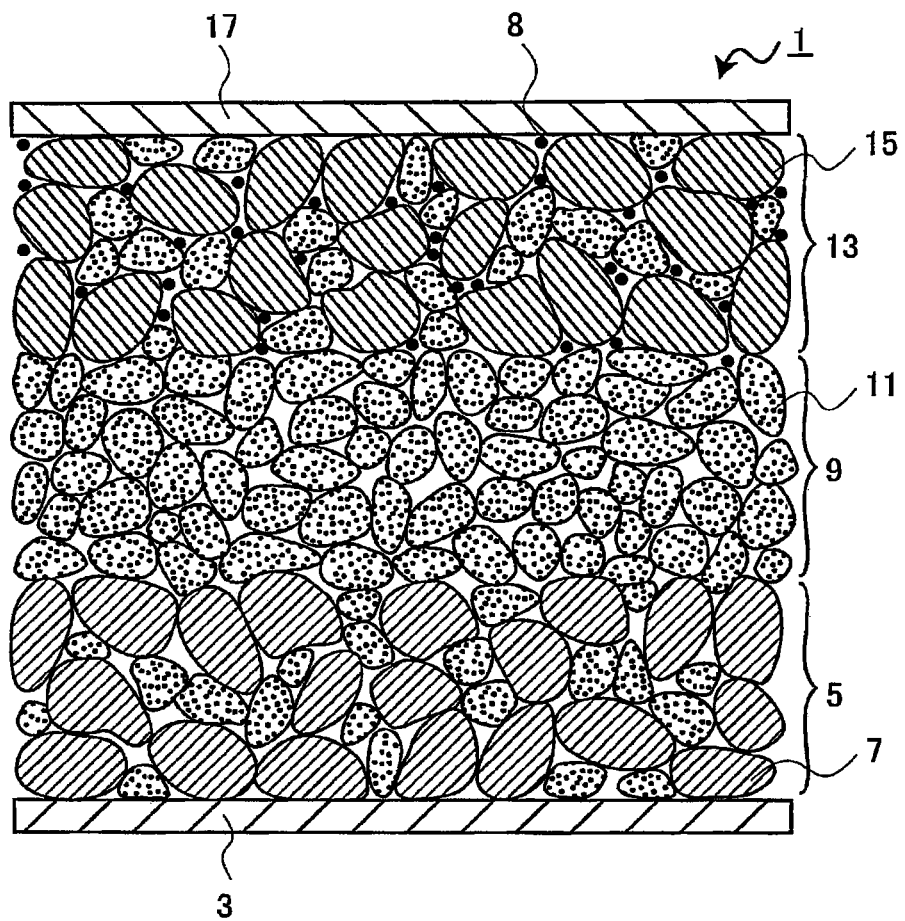
FIG. 1 is a sectional view of the first embodiment of the all-solid-state secondary battery.

Hereinafter, embodiments of the present invention will be described with reference to the accompanying figures. FIG. 1 is a sectional view of the first embodiment of the all-solid-state secondary battery. In the all-solid-state secondary battery 1 of the first embodiment, an anode active material layer 5, a solid electrolyte layer 9, and a cathode active material layer 13 is laminated between an anode current collector 3 and a cathode current collector 17 from the anode current collector 3 side. The anode active material layer 5 contains an anode active material 7 and a sulfide solid electrolyte 11. The solid electrolyte layer 9 contains a sulfide solid electrolyte 11. The cathode active material layer 13 contains a cathode active material 15, a sulfide solid electrolyte 11 and a conductive assistant 8.

Hereinafter, the composition of each layer will be described.

(Anode Current Collector)

Figure 2:
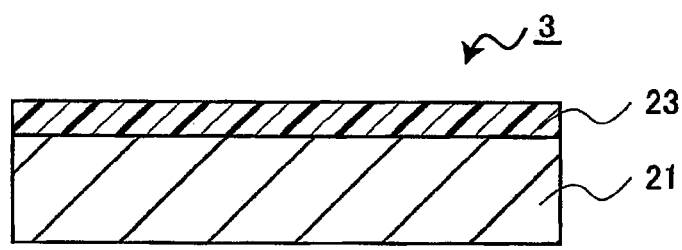
FIG. 2 is a sectional view of the anode current collector with a copper sulfide layer formed thereon, of the first embodiment of the all-solid-state secondary battery.

The anode current collector comprises a substrate containing copper or copper alloy, an anode active material layer formed thereon, and a sulfidation resistant layer on its surface. In the first embodiment, sulfide layer 23 is used as sulfidation resistant layer. In FIG. 2, the anode current collector 3 comprises a copper sulfide layer 23 laminated on the surface of the substrate 21 on which the anode active material layer is formed. The copper sulfide layer 23 formed has a thickness of 0.01 to 1 µm and the compound form is mainly formed of cuprous sulfide.

As the substrate 21, as the pure copper-type, electrolytic copper foil and rolled tough-pitch copper foil, as the alloy-type, Cu—Sn-type, Cu—Fe-type, Cu—Zr-type, Cu—Cr-type, and Corson-based rolled dilute alloys that is dissolved or precipitation-strengthened can be used.

For the sulfurization treatment or copper sulfide layer formation, the copper-based substrate 21 is subjected to immersion treatment in an aqueous solution of potassium sulfide or sodium sulfide. It is more favorable to add chlorine ion and/or ammonium ion. The pH is preferably acidic or slightly alkaline. The temperature can be room temperature. The time depends on the thickness of the layer formed, but for the purpose of the present invention, it may be about 10 seconds to several tens of seconds, or about a minute at the longest. As a pretreatment of the sulfurization treatment, it is preferable to perform immersion degreasing or cathode degreasing, then acid pickling (neutralization) treatment, thereafter. The surface of the substrate can be washed, and the wettability of the substrate at sulfurization can be improved.

(Effect of the Copper Sulfide Layer)

The copper sulfide layer 23 has sulfidation corrosion resistance. Furthermore, cuprous sulfide and cupric sulfide both show good conductivity. In particular, when the copper sulfide layer 23 is cuprous sulfide, the adhesiveness between the copper sulfide layer and the substrate copper foil becomes good.

(Sulfide Solid Electrolyte)

The sulfide solid electrolyte 11 is a solid electrolyte that contains a monovalent or divalent metal and sulfur. The metal contained in the sulfide solid electrolyte 11 is preferably Li, Na, or Mg. As a practical solid electrolyte that shows ion conductivity, a $Li^+$ conductor, $Na^+$ conductor, or $Mg^{2+}$ conductor is possible for the time being.

As a sulfide solid electrolyte that contains S, $Li_2S$—$P_2S_5$-type, $Li_2S$—$P_2S_5$—$SiS_2$-type, $Li_2S$—$P_2S_5$—$P_2O_5$-type, $Li_2S$—$SiS_2$—$Li_3PO_4$-type, $Li_2S$—$SiS_2$—$Li_4SiO_4$-type, $Li_2S$—$B_2S_3$—$LiI$-type, $Li_{3+5x}P_{1-x}S_4$-type (0.06≤x≤0.08), $Li_{3+5x}P_{1-x}S_{4-z}O_z$-type (0.02≤x≤0.11, 0.20≤z≤1.55), $Li_2S$—$GeS_2$—$Li_3PO_4$-type, or $Li_2S$—$GeS_2$—$P_2S_5$-type, $Li_2S$—$GeS_2$—$P_2O_5$-type etc., may each be used. As specific examples, $70Li_2S$-$30P_2S_5$, $75Li_2S$-$15P_2S_5$-$10P_2O_5$, $63Li_2S$-$36SiS_2$-$1Li_3PO_4$, $57Li_2S$-$38SiS_2$-$5Li_4SiO_4$, $30Li_2S$-$26B_2S_3$-$44LiI$, $Li_7P_3S_{11}$, $Li_3$-$25PO$-$95S_4$, $Li_3$-$35PO$-$93S_4$, $Li_3$-$35PO$-$93S_3$-$5O_{0.5}$, $Li_{10}$—$GeP_2$—$S_{12}$, $Li_3$-$25GeO$-$25PO$-$25S_4$, etc. may be listed.

(Cathode Current Collector)

The cathode current collector 17 is composed of aluminum, aluminum alloy, or stainless steel. As the cathode current collector 17, the 1000-type, which is a pure Al type, the 3000-type, which is an Al—Mn type, and the 8000-type, which is an Al—Fe type, are mainly used. Further, more specifically, pure Al-types such as 1085, 1N30, and 1100, and alloy-types such as 3003 and 8021 may be used. Stainless steel may be used regardless of its alloy composition or count, but since its corrosion resistance and cost largely differs depending on the components and composition, attention is required.

(Cathode Active Material)

As the cathode active material 15, cathode active materials that are generally used for lithium ion secondary batteries may be used. For example, lithium cobaltate and LCO with oxides such as lithium niobate ($LiNbO_3$) coated on its surface may be used. Further, ternary cathodes, wherein the Co in the LCO is partly substituted with Ni, Mn, or Al, may be used similarly. Furthermore, as the cathode active material 15, sulfur, copper Chevrel compounds of $M_xMo_6X_{8-y}$ (M=metals such as Cu, X=S, Se, Te, 0≤x≤4, 0≤y≤0.2), and Chevrel compounds of $Mo_6S_{8-x}$(0≤x≤0.2) may be used. By using such Chevrel compounds as a mixture with solid electrolytes, a composite, in which the interface resistance between the cathode active material 15 and the cathode current collector 17 is not large, can be obtained. More specifically, $Cu_2Mo_6S_8$ and $Mo_6S_8$ may be listed. The particle size of the cathode active material 15 is in the sub-micron to micron order. Further, in the cathode active material layer 13, conductive assistants 8, such as acetylene black, may be mixed so that the conductive path can easily be formed.

(Anode Active Material)

As the anode active material 7, anode active materials that are generally used in lithium ion secondary batteries may be used. For example, carbon-type active materials such as graphite (synthetic graphite or natural graphite), silicon and silicon oxides such as SiO-type ($Si+SiO_2$, $SiO_x$), alloy-type anode materials such as tin, are listed. Alternatively, mixtures of carbon-type materials and alloy-type materials may be used. In the present invention, in order to obtain a sulfidation corrosion resistance layer that is strong against corrosion on the copper foil, as the anode active material, $M_xP_y$ (0.9≤x, y≤10, M=Si, Sn, In, Al, Zn) may be used in particular, and since these characteristically show small volume change accompanied by charge-discharge, large capacity can be realized. More specifically, $Sn_4P_3$, $Sn_3P_4$, $SnP_3$, InP, etc. can be listed.

Figure 6:
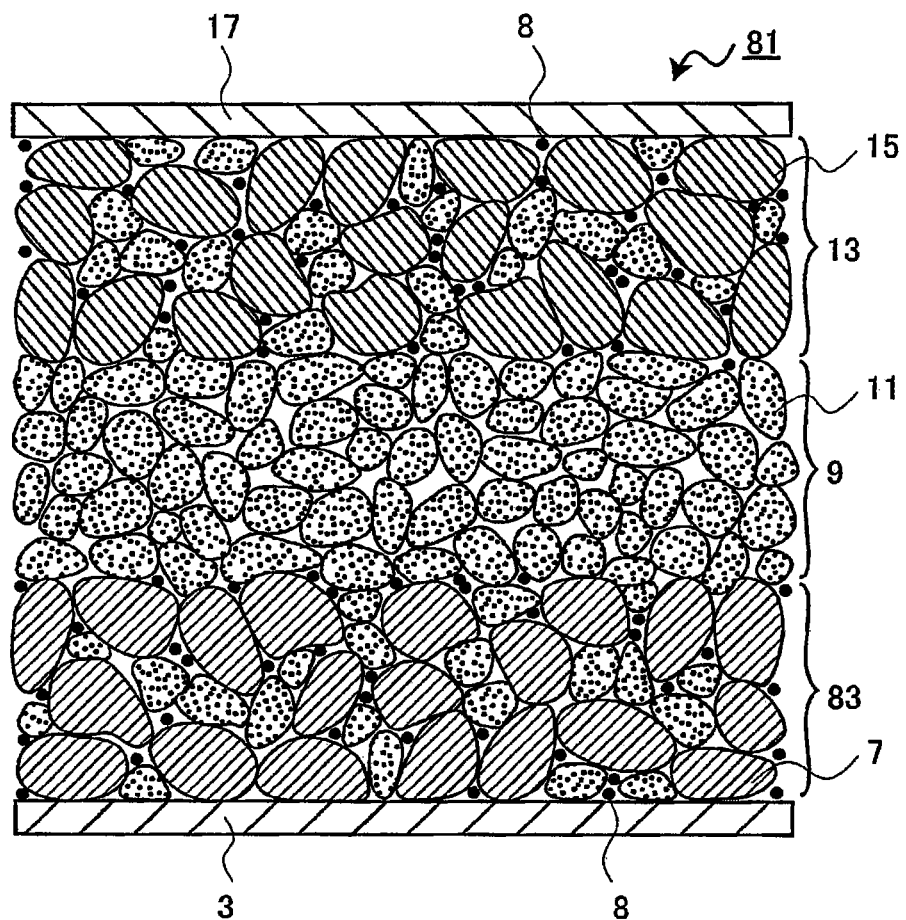
FIG. 6 is sectional view of the all-solid-state secondary battery of the first embodiment, wherein the anode active material layer contains a conductive assistant.

Furthermore, the anode active material layer 5 is formed by applying slurry obtained by mixing at least the anode active material 7, on to the anode current collector 3, and enables large capacity and reliability as a construction component of the all-solid-state secondary battery 1. In many cases, the slurry contains conductive assistants 8 such as acetylene black, aqueous-type binders and thickeners, and organic solvent-type binders. By adding a conductive assistant 8 in the slurry, an anode active material layer 83 that contains an anode active material 7, a sulfide solid electrolyte 11, and a conductive assistant 8, as shown in FIG. 6, may be obtained. By doing so, the conductivity of the anode active material layer 83 is enhanced.

By adding a sulfide solid electrolyte 11 in the slurry, an anode active material layer 5 that contains both an anode active material 7 and a sulfide solid electrolyte 11, as shown in FIG. 1, may be obtained. In FIG. 1, the anode active material layer 5 and the cathode active material layer 13 of the all-solid-state secondary battery 1 contains sulfide solid electrolyte 11. This composition allows high-speed charge-discharge, because the lithium ion can easily permeate the anode active material 7 and the cathode active material 15.

(Effect of the First Embodiment)

The anode current collector 3 of the first embodiment comprises a copper sulfide layer 23 that has sulfidation corrosion resistance on its surface, and thus, there is no danger of corrosion when using the sulfide solid electrolyte 11. Further, the copper-type substrate 21 shows high conductivity, and since cuprous sulfide and cupric sulfide both show good conductivity, the anode current collector 3 shows excellent electric conductivity. Furthermore, the adhesiveness between the copper sulfide layer 23 and the substrate 21 is good.

Second Embodiment

Copper Oxide Layer

Next, the second embodiment of the present invention will be described. In the second embodiment, the sulfidation resistant layer formed on the anode current collector differs from that of the first embodiment, and the sulfidation resistant layer is copper oxide. The sulfide solid electrolyte, cathode active material, and anode active material are the same as those of the first embodiment.

(Anode Current Collector)

Figure 3:
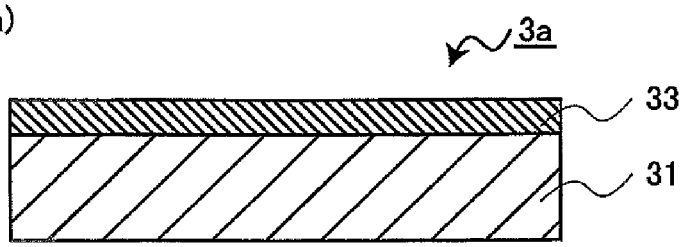
FIG. 3(a) is a sectional view of the anode current collector with one layer of a copper oxide layer formed thereon, of the second embodiment.
FIG. 3(b) is a sectional view of the anode current collector with two layers of copper oxide layers formed thereon, of the second embodiment.
Figure 3:
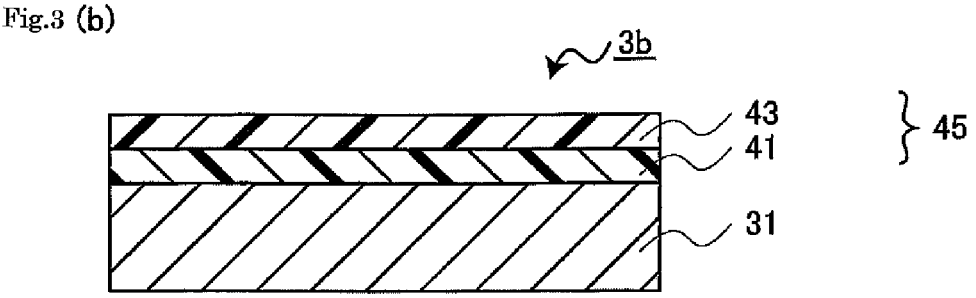

In FIG. 3(a), the anode current collector 3a of the second embodiment comprises a copper oxide layer 33 on the surface of the substrate 31 to which the anode active material layer 5 is formed. In FIG. 3(b), the anode current collector 3b of the second embodiment has a copper oxide layer 45 laminated on the surface of the substrate 31 to which the anode active material layer 5 is formed. The copper oxide layer 45 comprises a first layer 41, which is on the anode current collector side and mainly contains cuprous oxide, and a second layer 43, which is on the surface side and mainly contains cupric oxide.

The thickness of the copper oxide layer 33 and the copper oxide layer 45 are 0.01 to 1 μm, and the compound form may simply be a copper oxide layer 33 consisting mainly of cuprous oxide, or may have a first layer 41 on the substrate 31 side, consisting mainly of cuprous oxide, and a second layer 43 on the surface side, consisting mainly of cupric oxide, formed consecutively.

As the substrate 31, as the pure copper-type, electrolytic copper foil and rolled tough-pitch copper foil, as the alloy-type, Cu—Sn-type, Cu—Fe-type, Cu—Zr-type, Cu—Cr-type, and Corson-alloy-type rolled dilute alloys that is dissolved or precipitation-strengthened, having about 0.01 mass % to 5 mass % of the second component and beyond, can be used. When the amount of added components other than Ag is high, the conductivity decreases, and there is a danger of the current collectivity decreasing.

The oxidation treatment and the formation of the copper oxide layer is done by performing anode oxidation treatment while keeping the surface of the substrate in contact with a weak alkaline or alkaline aqueous solution. Aqueous solutions of potassium bicarbonate and sodium bicarbonate, ammonium carbonate, potassium carbonate, sodium carbonate, potassium hydroxide, and sodium hydroxide, may be used. If one wishes to mainly form a cupric oxide layer, which is a high oxidation layer, it is favorable to choose a highly alkaline aqueous solution such as carbonates and hydroxides. When forming on one surface, the aqueous solution may be supplied onto the surface to come in contact, and when forming on both sides, an immersion treatment may be performed. An aqueous solution with ammonium ion included in another neutral salt may also be used. When chlorine ion is added, a cuprous oxide layer that shows even higher adhesiveness to the substrate can be formed. The temperature of the solution may be room temperature, since too much heating may cause much mist arising from the liquid, leading to unsuitable environment. The time depends on the formation thickness and the current density, but may be about ten seconds to several minutes. The current density may be chosen from the view point of economic efficiency as 0.1 to 20 A/dm$^2$, but may be much slower to form a copper oxide layer that shows good adhesiveness. It may also be a much higher current density for a speedier formation. Further, formation may also be performed by potential control using a reference electrode. For example, the current may be set and controlled with the range of 0.6 to 0.8 V (cuprous oxide) or 0.8 to 1.0 V (cupric oxide) of Ag/AgCl electrode standard set as the goal, depending on the aqueous solution used and the form of the copper oxide layer.

Furthermore, as a method of forming copper oxide layer, heat treatment in a furnace of inert-gas environment such as $N_2$, while supplying a given concentration of oxygen, is also applicable. The temperature is preferably 80 to 200° C. When the thickness is thick, a high temperature of above 1000° C. is also possible, which allows the formation of a dense cuprous oxide layer. For thin layer such as foils and plates, heat oxidation treatment at an excessively high temperature may lead to defects such as property change of the substrate and wrinkles due to intense distortion in normal plate processes. The oxygen concentration should be decided by experiment, since it depends on the furnace, and batch or continuous treatment, but may be roughly about 30 to 30000 ppm. The same can be said for time, and it should be decided along with the temperature, depending on the desired formation thickness and compound form.

As a pretreatment of the present oxidation treatment, it is preferable to perform immersion degreasing or cathode degreasing, then acid pickling (neutralization) treatment, thereafter. The surface of the substrate can be washed, and the wettability of the sulfurized substrate can be improved. The treatment liquid shows degreasing effect due to the alkaline aqueous solution.

(Effect of the Second Embodiment)

Copper oxide shows high resistance against corrosion, which is an oxidation reaction, and thus, there is no danger of corrosion when coming in contact with the sulfide solid electrolyte. Therefore, the anode current collector 3a and 3b of the second embodiment comprises a copper oxide layer 33 or 45 that has sulfidation corrosion resistance on its surface, and thus, there is no danger of corrosion when using the sulfide solid electrolyte 11. In the anode current collectors 3a and 3b, because cuprous oxide and copper is in contact between the copper oxide layer 33 and the substrate 31 or the first layer 41 and the substrate 31, the substrate 31 and the copper oxide layer 33, or the copper oxide layer 45, show good adhesiveness. Further, because copper oxide is semiconductive, it does not disturb the current collection of the anode current collectors 3a and 3b.

Third Embodiment

Sulfidation Resistant Metal Layer

Next, the third embodiment of the present invention will be described. In the third embodiment, the sulfidation resistant layer that is formed on the anode current collector differs from those of the first and second embodiments, and the sulfidation resistant layer is a sulfidation resistant metal layer. The sulfide solid electrolyte, cathode active material, and anode active material are the same as those of the first and second embodiments.

Figure 4:
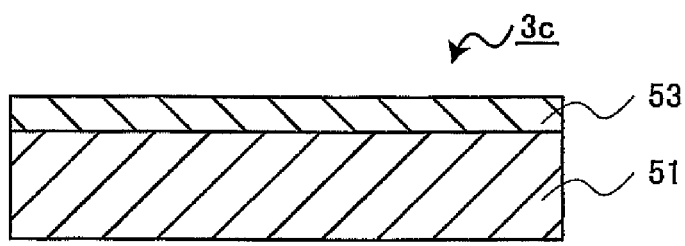
FIG. 4 is a sectional view of the anode current collector with a sulfidation resistant layer formed thereon, of the third embodiment.

In FIG. 4, the anode active 3c has a sulfidation resistant metal layer 53 laminated on the side of the substrate 51, on which the anode active material layer 5 is formed. The thickness of the sulfidation resistant metal layer 53 is 0.01 to 5 μm. Forming a sulfidation resistant metal layer 53 that is thicker than 5 nm is not desirable from the view point of economic and production efficiency. The sulfidation resistant metal layer 53 contains Ni, Zn, Sn, etc., and the sulfidation resistant metal layer 53 may be such single metal or an alloy with another substance. Further, this metal layer may be of multiple layers to increase the sulfidation resistance of the current collector substrate. For example, a first metal layer of Zn-type or Sn-type may be formed on the surface of the current collector, after which a Ni-type metal layer may be formed as a second layer on top of the first metal layer. By doing so, the sulfidation resistance can further be enhanced.

As the substrate 51, as the pure copper-type, electrolytic copper foil and rolled tough-pitch copper foil may be used, and as the alloy-type, mainly, rolled Cu—Sn-type, Cu—Fe-type, Cu—Zr-type, Cu—Cr-type, and Corson-alloy-type dilute alloys that are dissolved or precipitation-strengthened, may be used. The sulfidation resistant metal layer formed on the substrate surface layer may be heated or subjected to other diffusion treatment for alloying with the substrate.

To form the sulfidation resistant metal layer 53, the Cu substrate is immersed into an electrolyte solution of Ni or Ni-alloy bath, Zn or Zn-alloy bath, Sn or Sn-alloy bath, then subjected to cathode electrolysis treatment. For a Ni-type electrodeposition layer, Ni-sulfate and Ni-carbonate bath may be used. For a Zn-type, Zn-sulfate bath may be used, and for a Sn-type Sn-sulfate and organic acid bath may be used. The pH of the organic acid bath is between neutral to weak alkaline. The temperature may be about room temperature to 40° C. The time depends on the desired formation thickness and the current density, but for the purpose of the present invention, a few seconds to about 30 seconds, or about 1 minute at the longest, should be sufficient. The current density depends on the electrodeposition type and the desired formation thickness, but may be about 0.01 to 5 A/dm$^3$. When using a rolled material, as a pretreatment of the present electrodeposition treatment, it is preferable to perform immersion degreasing or cathode degreasing, then acid pickling (neutralization) treatment, thereafter. The surface of the substrate can be washed, and the wettability of the substrate at electrodeposition can be improved.

(Effect of the Third Embodiment)

The sulfidation resistant metal layer 53 contains Ni, Zn, and Sn, which resist corrosion caused by sulfides. Thus, because the anode current collector 3c of the third embodiment comprises a sulfidation resistant metal layer 53 that shows sulfidation corrosion resistance on the surface, there is no danger of corrosion, even when sulfide solid electrolyte 11 is used. In a sulfidation resistant metal layer formed of multiple layers, the Zn and Sn of the first layer forms a diffusion alloyed layer with the substrate Cu, by immediately undergoing mutual diffusion. The diffusion alloyed layer enhances the corrosion resistance and heat resistance of the substrate Cu. In particular, Sn forms the compounds Cu3Sn (ε-phase) and Cu6Sn5 (η'-phase) and enhances protection of the substrate. The operation environment of secondary batteries could be up to 80° C., and in such a case, the substrate material may diffuse and migrate to the surface layer, which may cause the aforementioned sulfidation resistance to decrease, leading to the occurrence of high-resistance sulfides at the surface layer and deterioration of the battery performance. Note that, as described previously, a Ni-type metal layer may be formed on top of the diffusion alloyed layer. By forming the sulfidation resistant metal layer or the aforementioned multiple layered metal layer form, deterioration of the battery cell in such high-temperature operation environment can be prevented or suppressed. Further, since copper-type substrates 51 show high conductivity and the sulfidation resistant metal layer 53 is composed mainly of a highly conductive metal, the anode current collector 3c shows good current collection properties. Furthermore, the sulfidation resistant metal layer 53 formed by electrodeposition shows good adhesiveness with the substrate 51, and can decrease the interface contact resistance between them.

Fourth Embodiment

Next, the fourth embodiment of the present invention will be described. In the fourth embodiment, the compressive strength of the surface of the anode current collector on which the anode active material layer is formed is 1250 to 3000 MPa. Further, it is favorable that the compressive elastic modulus of the surface of the anode current collector on which the anode active material layer is formed is 60 to 125 GPa. The sulfide solid electrolyte, cathode active material, and anode active material are the same as those of the first to third embodiments.

In the anode current collector of the fourth embodiment, the indenter-measured compressive strength of the layer that is 2 μm deep from the layer that is in contact with the anode active material or the solid electrolyte is 125 to 3000 MPa. Further, similarly, the indenter compressive elastic modulus is preferably 60 to 125 GPa. The compressive strength and the compressive elastic modulus of the surface may be measured by an indenter. Although it depends on the load applied, in general, the indenter is a device for measuring the intermediate range between (micro) Vickers and nano-indenters, and since at a standard load, its usual invasion depth for a generic copper foil is 2 μm or less, it is applicable to copper foil that has a thickness of about 10 μm. Further, for thinner foils, a super-light-load-type nano-indenter may be used for measurement. For example, as a nano-indenter, ENT-1100a micro indentation hardness tester, or ENT-2100 super-light-load-type micro indentation hardness tester, both by ELIONIX Inc., may be used.

Figure 5:
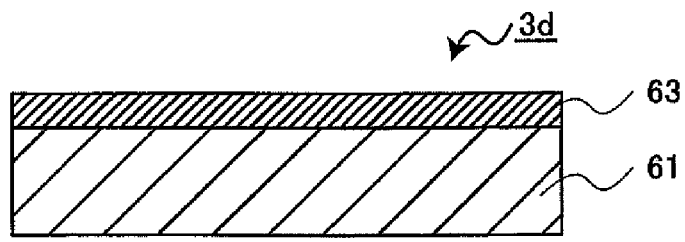
FIG. 5 is a sectional view of the anode current collector with a copper electrodeposition layer formed thereon, of the fourth embodiment.

In FIG. 5, the anode current collector 3d of the fourth embodiment comprises a copper electrodeposition layer 63 on the side of the substrate 61 on which the anode active material 5 is formed. The copper electrodeposition layer 63 contains Mo or W in the surface layer. The thickness of the copper electrodeposition layer 63 that is formed is 0.1 to 2.5 μm, and copper alloy electrodeposition layers containing Mo and W may be exemplified as the copper electrodeposition layer 63. The base copper electrodeposition solution may be prepared by generic copper ions and sulfate ions, adding tungstate or molybdate (salts of potassium or sodium for each case). Electrodeposition may be performed with a liquid temperature of around room temperature, at a current density of roughly 0.5 to 10 A/dm$^3$. The copper concentration and the sulfuric acid concentration may both be selected from a range of about 20 to 100 g/dm$^3$. An electrolyte solution obtained by adding tungsten compounds or molybdenum compounds to the copper sulfate aqueous solution is used. The additive concentration depends on the form of the compound and the amount of Mo and W contained in the compound, but may be about 0.05 to 5 g/dm$^3$. Each metal ion concentration should be about 5 to 3000 ppm, but higher concentrations could be chosen. However, since its economic efficiency decreases, it should depend on the concentration in the electrodeposition layer and the hardness (strength and elastic modulus) of the surface layer. For example, by adding 0.5 to 10 g/dm$^3$ of potassium tungstate or sodium tungstate, the required compressive strength and compressive elastic modulus can be obtained for the surface. Higher concentrations may be used, too, but the economic efficiency will decline.

Although a Ag electrodeposition layer is also a candidate from the view point of current collectivity and conductivity, there is a problem in that it is low in economic efficiency. The Sn deposition layer is favorably used, since it enhances hardness through diffusion alloying with the copper substrate. A sulfuric acid bath or organic acid bath that contains sulfate ions and divalent tin ions is also used for the Sn deposition layer. Divalent tin ions tend to be oxidized to quadrivalent tin ions, but they do not directly affect the electrodeposition layer.

As the substrate 61, as the pure copper-type, electrolytic copper foil and rolled tough-pitch copper foil, as the alloy-type, Cu—Sn-type, Cu—Fe-type, Cu—Zr-type, Cu—Cr-type, and Corson-based rolled dilute alloys that is dissolved or precipitation-strengthened, having about 0.01 mass % to 5 mass % of the second component and beyond, can be used. When the amount of added components other than Ag is high, the conductivity decreases, and there is a danger of the current collectivity decreasing.

As a pretreatment of the present electrodeposition treatment, immersion degreasing or cathode degreasing, then acid pickling (neutralization) treatment may be performed. The surface of the substrate can be washed, and the wettability of the substrate can be improved. The treatment liquid itself shows degreasing effect due to the alkaline aqueous solution.

(Effect of the Fourth Embodiment)

Because the anode current collector of the fourth embodiment has high mechanical strength on the surface on which the anode active material layer is formed, it shows high press resistance. For this reason, when an all-solid-state secondary battery is produced by integral press-molding using a sulfide solid electrolyte, the anode current collector does not undergo defects such as ruptures and current collectivity deterioration. Further, the productivity increases in the sense that even for cells that conventionally could not be subjected to press-molding, press-molding becomes possible. In particular, the copper electrodeposition layer 63 shows good adhesiveness with the substrate 61. Further, since the copper-type substrate 61 shows high conductivity and the copper electrodeposition layer 63 that contains Mo and W shows high conductivity, they show good current collectivity and adhesiveness, and are thus, favorable as components of integrally-molded cells. It is also possible to use high-strength or high-elastic modulus materials for the current collector itself, but it will require the use of expensive materials, and it is difficult to put to practical use. Since the compressive strength and compressive elastic modulus required for press resistance is only needed on the surface layer of the current collector, for example, by forming the copper electrodeposition layer that shows high strength and high elastic modulus consecutively, following the surface treatment process for forming the aforementioned sulfidation resistant metal layer, the cost can be kept low and the present property can be added economically.

<Method for Producing All-Solid-State Secondary Battery>

The method for producing the all-solid-state secondary battery 1 is not particularly limited, but production may proceed as follows. First, the cathode active material 15 and the sulfide solid electrolyte 11 are separately pelletized by pressing. Then, the cathode current collector 17, the cathode active material 15 pellet, the anode active material 7, and the anode current collector 3 are piled in layers, and subjected to press integration molding in the composition of cathode current collector, cathode active material layer, solid electrolyte layer, anode active material layer, anode current collector, to thereby produce the all-solid-state secondary battery.

EXAMPLE

Next, in order to further clarify the effect of the present invention, examples and comparative examples will be described in detail. However, the present invention is not limited to such examples.

Example 1-1

Preparation of Solid Electrolyte

As raw materials for the solid electrolyte, $Li_2S$ and $P_2S_5$ were mixed in a mortar in a glove box under Ar atmosphere, after which the mixture was enclosed in a Zr pot with Zr balls, subjected to 15 hours of mechanical milling (hereinafter abbreviated as MM) at 500 rpm in room temperature, to thereby obtain amorphous particulates of $7\text{-}Li_2\text{-}30P_2S_5$. Differential thermal analysis showed an exothermic peak at 200° C., indicating that it undergoes crystallization. The sample was crystallized by subjecting to 2 hours of heat treatment and pelletized, a carbon (paste) electrode was formed, and the conductivity was measured by the AC impedance method. As a result, a high value of $10^{-3}$ S/cm was obtained and the present material was found to show high Li ion conductivity.

(Anode Current Collector: Formation of Copper Sulfide Layer)

An electrolytic copper foil (pure copper-type) with a thickness of 20 μm was subjected to immersion treatment in a 5 g/dm³ aqueous solution of $K_2S$ with a pH of 1.5 for 30 seconds in room temperature, washed in water, and dried. When this sulfurized copper foil was subjected to cathode reduction treatment in a thoroughly $N_2$ deaerated 0.5 N-KCl aqueous solution, most showed a plateau region at the $Cu_2S$ redox potential, and its reduction electricity amount indicated that a $Cu_2S$ layer of about 0.1 μm thickness was formed on the surface.

(Cathode Active Material Layer)

As the cathode active material layer, a composite layer of lithium cobalt oxide ($LiCoO_2$) with lithium niobate ($LiNbO_3$) coated on the outer-most layer, the present all-solid electrolyte, and acetylene black, mixed at a ratio of 45:50:5 was used. For surface coating, using a tumbling fluidized bed coating apparatus, an ethyl alcohol solution with lithium alkoxide and niobium alkoxide dissolved therein was sprayed and coated, after which it was subjected to heating under oxygen to thereby decompose the alcohol.

(Anode Active Material Layer)

A composite layer obtained by mixing artificial graphite and the present all-solid electrolyte at a ratio of 60:40 was used.

(Preparation of All-Solid-State Secondary Battery)

The cathode active material layer and the solid electrolyte layer were each pelletized by pressing, and the cathode current collector, the cathode active material layer pellet, the solid electrolyte layer pellet, the anode active material, and the anode current collector were piled in layers and subjected to press integration molding in the composition of cathode current collector/cathode active material layer/solid electrolyte layer/anode active material layer/anode current collector to obtain an all-solid-state secondary battery. Note that a 1000-series Al foil was used as the cathode current collector.

Example 1-2

Preparation of Solid Electrolyte

Amorphous particulates were obtained under the same conditions as those of Example 1-1, other than using $Li_2S$ and $P_2S_5$ and $P_2O_5$ in a ratio for obtaining a $70LiS-20P_2S_5-10P_2O_5$ composition. From the results of differential thermal analysis, the crystallized sample obtained by heating at 300° C. for 2 hours was pelletized, and its ion conductivity was measured to show about $10^{-3}$ S/cm.

(Anode Current Collector: Formation of Copper Sulfide Layer)

The anode current collector was formed by the same method as that of Example 1-1.

(Cathode Active Material Layer)

For the cathode active material layer, a composite layer of $Mo_6S_8$, a synthesized and crystallized solid electrolyte, $70Li_2S-20P_2S_5-10P_2O_5$, and acetylene black mixed in a ratio of 40:55:5 was used. $Mo_6S_8$ was obtained by subjecting $Cu_2Mo_6S_8$ to reduction treatment in an acid aqueous solution.

(Anode Active Material Layer)

The anode active material layer was formed by the same method as that of Example 1-1.

(Preparation of All-Solid-State Secondary Battery)

The all-solid-state secondary battery was formed by the same method as that of Example 1-1.

Example 1-3

Preparation of Solid Electrolyte

The solid electrolyte was prepared by the same method as that of Example 1-2.

(Anode Current Collector: Formation of Copper Sulfide Layer)

The anode current collector was prepared by the same method as that of Example 1-2.

(Cathode Active Material Layer)

The cathode active material layer was prepared by the same method as that of Example 1-2.

(Anode Active Material Layer)

For the anode active material layer, a composite layer of $Sn_4P_3$ and a synthesized and crystallized solid electrolyte, $70Li_2S-20P_2S_5-10P_2O_5$, mixed in a ratio of 1:1 was used. $Sn_4P_3$ was synthesized by subjecting Sn and phosphorus to MM treatment in a ball mill at 300 rpm for 3 hours to obtain the composition.

(Preparation of All-Solid-State Secondary Battery)

The all-solid-state secondary battery was formed by the same method as that of Example 1-2.

Example 1-4

Preparation of Solid Electrolyte

The solid electrolyte was prepared by the same method as that of Example 1-3.

(Anode Current Collector: Formation of Copper Sulfide Layer)

The anode current collector was prepared by the same method as that of Example 1-3.

(Cathode Active Material Layer) For the cathode active material layer, a composite layer of sulfur powder, a synthesized and crystallized solid electrolyte, $70Li_2S-20P_2S_5-10P_2O_5$, and acetylene black mixed in a ratio of 30:60:10 was used.

(Anode Active Material Layer)

The anode active material layer was formed by the same method as that of Example 1-3.

(Preparation of All-Solid-State Secondary Battery)

The all-solid-state secondary battery was formed by the same method as that of Example 1-3.

Example 1-5

Preparation of Solid Electrolyte

The solid electrolyte was prepared by the same method as that of Example 1-1.

(Anode Current Collector: Formation of Copper Sulfide Layer)

An electrolytic copper foil (pure copper-type) with a thickness of 20 μm was subjected to immersion treatment in a 5 g/dm³ aqueous solution of $K_2S$ with a pH of 1.5 for 6 seconds in room temperature, washed in water, and dried. When this sulfurized copper foil was subjected to cathode reduction treatment in a thoroughly $N_2$ deaerated 0.5 N-KCl aqueous solution, most showed a plateau region at the $Cu_2S$ redox potential, and its reduction electricity amount indicated that a $Cu_2S$ layer of about 0.01 μm thickness was formed on the surface.

(Cathode Active Material Layer)

The cathode active material layer was prepared by the same method as that of Example 1-2.

(Anode Active Material Layer)

The anode active material layer was formed by the same method as that of Example 1-1.

(Preparation of All-Solid-State Secondary Battery)

The all-solid-state secondary battery was formed by the same method as that of Example 1-1.

Example 1-6

Preparation of Solid Electrolyte

The solid electrolyte was prepared by the same method as that of Example 1-1.

(Anode Current Collector: Formation of Copper Sulfide Layer)

An electrolytic copper foil (pure copper-type) with a thickness of 20 μm was subjected to immersion treatment in a 5 g/dm³ aqueous solution of $K_2S$ with a pH of 1.5 for 200 seconds in room temperature, washed in water, and dried. When this sulfurized copper foil was subjected to cathode reduction treatment in a thoroughly $N_2$ deaerated 0.5 N-KCl aqueous solution, most showed a plateau region in the $Cu_2S$ redox potential, and its reduction electricity amount indicated that a $Cu_2S$ layer of about 1 μm thickness was formed on the surface.

(Cathode Active Material Layer)

The cathode active material layer was prepared by the same method as that of Example 1-1.

(Anode Active Material Layer)

The anode active material layer was prepared by the same method as that of Example 1-1.

(Preparation of All-solid-state Secondary Battery) The all-solid-state secondary battery was formed by the same method as that of Example 1-1.

Example 2-1

Preparation of Solid Electrolyte

The solid electrolyte was prepared by the same method as that of Example 1-1.

(Anode Current Collector: Formation of Copper Oxide Layer)

An electrolytic copper foil (pure copper-type) with a thickness of 20 μm was subjected to anode electrolytic treatment at a current density of 1 A/dm$^2$ while immersing in a 1 g/dm$^3$ aqueous solution of NaOH with a pH of 10 for 30 seconds in room temperature, washed in water, and dried. When this oxidized copper foil was subjected to cathode reduction treatment in a thoroughly N$_2$ deaerated 0.5 N-KCl aqueous solution, plateau regions in the CuO and Cu$_2$O redox potential appeared, and its reduction electricity amount indicated that a Cu$_2$O layer of about 0.1 μm thickness and a CuO layer of about 0.2 μm thickness was formed on the surface.

(Cathode Active Material Layer)

The cathode active material layer was prepared by the same method as that of Example 1-1.

(Anode Active Material Layer)

The anode active material layer was prepared by the same method as that of Example 1-1.

(Preparation of All-solid-state Secondary Battery) The all-solid-state secondary battery was formed by the same method as that of Example 1-1.

Example 2-2

Preparation of Solid Electrolyte

Amorphous particulates were obtained under the same conditions as those of Example 2-1, other than using Li$_2$S and P$_2$S$_5$ and P$_2$O$_5$ in a ratio for obtaining a 70Li$_2$S-20P$_2$S$_5$-10P$_2$O$_5$ composition. From the results of differential thermal analysis, the crystallized sample obtained by heating at 300° C. for 2 hours was pelletized, and its ion conductivity was measured, which was found to be about 10$^{-3}$ S/cm.

(Anode Current Collector: Formation of Copper Oxide Layer)

The anode current collector was prepared by the same method as that of Example 2-1.

(Cathode Active Material Layer)

For the cathode active material layer, a composite layer of Mo$_6$S$_8$, a solid electrolyte, and acetylene black mixed in a ratio of 40:55:5 was used. Mo$_6$S$_8$ was obtained by subjecting Cu$_2$Mo$_6$S$_8$ to a reduction treatment by an acid aqueous solution.

(Anode Active Material Layer)

The anode active material layer was prepared by the same method as that of Example 2-1.

(Preparation of All-Solid-State Secondary Battery)

The all-solid-state secondary battery was formed by the same method as that of Example 2-1.

Example 2-3

Preparation of Solid Electrolyte

The solid electrolyte was prepared by the same method as that of Example 2-2.

(Anode Current Collector: Formation of Copper Oxide Layer)

The anode current collector was prepared by the same method as that of Example 2-2.

(Cathode Active Material Layer)

The cathode active material layer was prepared by the same method as that of Example 2-2.

(Anode Active Material Layer)

For the anode active material layer, a composite layer of Sn$_4$P$_3$ and a synthesized and crystallized solid electrolyte, 70Li$_2$S-20P$_2$S$_5$-10P$_2$O$_5$, mixed in a ratio of 1:1 was used. Sn$_4$P$_3$ was synthesized by subjecting Sn and phosphorus to MM treatment in a ball mill at 300 rpm for 3 hours to obtain the composition ratio.

(Preparation of All-Solid-State Secondary Battery)

The all-solid-state secondary battery was formed by the same method as that of Example 2-2.

Example 2-4

Preparation of Solid Electrolyte

The solid electrolyte was prepared by the same method as that of Example 2-3.

(Anode Current Collector: Formation of Copper Oxide Layer)

The anode current collector was prepared by the same method as that of Example 2-3.

(Cathode Active Material Layer)

For the cathode active material layer, a composite layer of sulfur powder, a synthesized and crystallized solid electrolyte, 70Li$_2$S-20P$_2$S$_5$-10P$_2$O$_5$, and acetylene black mixed in a ratio of 30:60:10 was used.

(Anode Active Material Layer)

The anode active material layer was prepared by the same method as that of Example 2-3.

(Preparation of All-solid-state Secondary Battery)

The all-solid-state secondary battery was formed by the same method as that of Example 2-3.

Example 2-5

Preparation of Solid Electrolyte

The solid electrolyte was prepared by the same method as that of Example 2-1.

(Anode Current Collector: Formation of Copper Oxide Layer)

An electrolytic copper foil (pure copper-type) with a thickness of 20 μm was subjected to anode electrolytic treatment at a current density of 0.2 A/dm$^2$ while immersing in a 1 g/dm$^3$ aqueous solution of NaOH with a pH of 10 for 5 seconds in room temperature, washed in water, and dried. When this oxidized copper foil was subjected to cathode reduction treatment in a thoroughly N$_2$ deaerated 0.5 N-KCl aqueous solution, plateau regions in the CuO and Cu$_2$O redox potentials appeared, and their reduction electricity amount indicated that a Cu$_2$O layer of about 0.001 μm thickness and a CuO layer of about 0.01 μm thickness was formed on the surface.

(Cathode Active Material Layer)

The cathode active material layer was prepared by the same method as that of Example 2-1.

(Anode Active Material Layer)

The anode active material layer was prepared by the same method as that of Example 2-1.

(Preparation of All-Solid-State Secondary Battery)

The all-solid-state secondary battery was formed by the same method as that of Example 2-1.

Example 2-6

Preparation of Solid Electrolyte

The solid electrolyte was prepared by the same method as that of Example 2-1.

(Anode Current Collector: Formation of Copper Oxide Layer)

An electrolytic copper foil (pure copper-type) with a thickness of 20 μm was subjected to anode electrolytic treatment at a current density of 3 A/dm$^2$ while immersing in a 1 g/dm$^3$ aqueous solution of NaOH with a pH of 10 for 30 seconds in room temperature, washed in water, and dried. When this oxidized copper foil was subjected to cathode reduction treatment in a thoroughly N$_2$ deaerated 0.5 N-KCl aqueous solution, plateau regions in the CuO and Cu$_2$O redox potentials appeared, and their reduction electricity amounts indicated that a Cu$_2$O layer of about 0.1 μm thickness and a CuO layer of about 0.9 μm thickness was formed on the surface.

(Cathode Active Material Layer)

The cathode active material layer was prepared by the same method as that of Example 2-1.

(Anode Active Material Layer)

The anode active material layer was prepared by the same method as that of Example 2-1.

(Preparation of All-solid-state Secondary Battery)

The all-solid-state secondary battery was formed by the same method as that of Example 2-1.

Example 3-1

Preparation of Solid Electrolyte

As raw materials for the solid electrolyte, Li$_2$S and P$_2$S$_5$ were mixed in a mortar in a glove box under Ar atmosphere, after which the mixture was enclosed in a Zr pot with Zr balls, subjected to 20 hours of MM treatment at 500 rpm in room temperature, to thereby obtain amorphous particulates of 70Li$_2$S-30P$_2$S$_5$. Differential thermal analysis showed an exothermic peak at 200° C., indicating that it undergoes crystallization. The sample was crystallized by subjecting to 2 hours of heat treatment and pelletized, a carbon (paste) electrode was formed, and the conductivity was measured by the AC impedance method. As a result, a high value of 10$^{-3}$ S/cm was obtained and the present material was found to show high Li ion conductivity.

(Anode Current Collector: Formation of Sulfidation Resistant Metal Layer)

An electrolytic copper foil (pure copper-type) with a thickness of 20 μm was subjected to immersion treatment in a 25 g/dm$^3$ aqueous solution of nickel sulfate with a pH of 1.5 for 15 seconds in room temperature, washed in water, and dried. The Kocour dissolution test of the surface of this electrodeposited copper foil showed that a Ni layer with a thickness of about 0.2 μm was formed.

(Cathode Active Material Layer)

The cathode active material layer was prepared by the same method as that of Example 1-1.

(Anode Active Material Layer)

The anode active material layer was prepared by the same method as that of Example 1-1.

(Preparation of All-solid-state Secondary Battery)

The all-solid-state secondary battery was formed by the same method as that of Example 1-1.

Example 3-2

Preparation of Solid Electrolyte

Amorphous particulates were obtained under the same conditions as those of Example 3-1, other than using Li$_2$S and P$_2$S$_5$ and P$_2$O$_5$ in a ratio for obtaining a 70Li$_2$S-20P$_2$S$_5$-10P$_2$O$_5$ composition. From the results of differential thermal analysis, the crystallized sample obtained by heating at 300° C. for 2 hours was pelletized, and its ion conductivity was measured, which was found to be about 10$^{-3}$ S/cm.

(Anode Current Collector: Formation of Sulfidation Resistant Metal Layer)

An electrolytic copper foil (pure copper-type) with a thickness of 20 μm was subjected to electrodeposition treatment in a 5 g/dm$^3$ aqueous solution of tin sulfate with a pH of 1.5 for 15 seconds in room temperature, washed in water, and dried by heating at 125° C. The Kocour dissolution test of the surface of this electrodeposited copper foil showed that a Sn layer with a thickness of about 0.2 μm was formed. Further, SEM observation and EPMA analysis it was found that Sn diffused into and formed an alloy with the copper substrate.

(Cathode Active Material Layer)

For the cathode active material layer, a composite layer of Mo$_6$S$_8$, and a synthesized and crystallized solid electrolyte, 70Li$_2$S-20P$_2$S$_5$-10P$_2$O$_5$, and acetylene black mixed in a ratio of 40:55:5 was used. Mo$_6$S$_8$ was obtained by subjecting Cu$_2$Mo$_6$S$_8$ to a reduction treatment by an acid aqueous solution.

(Anode Active Material Layer)

The anode active material layer was prepared by the same method as that of Example 3-1.

(Preparation of All-Solid-State Secondary Battery)

The all-solid-state secondary battery was formed by the same method as that of Example 3-1.

Example 3-3

Preparation of Solid Electrolyte

The solid electrolyte was prepared by the same method as that of Example 3-2.

(Anode Current Collector: Formation of Sulfidation Resistant Metal Layer)

The anode current collector was prepared by the same method as that of Example 3-2.

(Cathode Active Material Layer)

The cathode active material layer was prepared by the same method as that of Example 3-2.

(Anode Active Material Layer)

For the anode active material layer, a composite layer of Sn$_4$P$_3$, and a synthesized and crystallized solid electrolyte, 70Li$_2$S-20P$_2$S$_5$-10P$_2$O$_5$, and acetylene black mixed in a ratio of 40:55:5 was used. Sn$_4$P$_3$ was synthesized by subjecting Sn and phosphorus to MM treatment in a ball mill at 300 rpm for 3 hours to obtain the composition ratio.

(Preparation of all-Solid-State Secondary Battery)

The all-solid-state secondary battery was formed by the same method as that of Example 3-2.

Example 3-4

Preparation of Solid Electrolyte

The solid electrolyte was prepared by the same method as that of Example 3-3.

(Anode Current Collector: Formation of Sulfidation resistant Metal Layer)

The anode current collector was prepared by the same method as that of Example 3-3.

(Cathode Active Material Layer)

For the cathode active material layer, a composite layer of sulfur powder, a synthesized and crystallized solid electrolyte, $70Li_2S\text{-}20P_2S_5\text{-}10P_2O_5$, and acetylene black mixed in a ratio of 30:60:10 was used.

(Anode Active Material Layer)

The anode active material was prepared by the same method as that of Example 3-3.

(Preparation of All-Solid-State Secondary Battery)

The all-solid-state secondary battery was formed by the same method as that of Example 3-3.

Example 3-5

Preparation of Solid Electrolyte

The all-solid-state secondary battery was formed by the same method as that of Example 3-2.

(Anode Current Collector: Formation of Sulfidation Resistant Metal Layer)

An electrolytic copper foil (pure copper-type) with a thickness of 20 μm was subjected to electrodeposition treatment at 5 A/dm² in a 250 g/dm³ aqueous solution of zinc sulfate for 120 seconds in room temperature, washed in water, and dried. The Kocour dissolution test of the surface of this electrodeposited copper foil showed that a Zn layer with a thickness of about 2 μm was formed. Further, through SEM observation and EPMA analysis, it was found that Zn diffused into and formed an alloy with the copper substrate.

(Cathode Active Material Layer)

The cathode active material was prepared by the same method as that of Example 3-2.

(Anode Active Material Layer)

The anode active material was prepared by the same method as that of Example 3-2.

(Preparation of All-Solid-State Secondary Battery)

The all-solid-state secondary battery was formed by the same method as that of Example 3-2.

Example 3-6

Preparation of Solid Electrolyte

The all-solid-state secondary battery was formed by the same method as that of Example 3-1.

(Anode Current Collector: Formation of Sulfidation Resistant Metal Layer)

An electrolytic copper foil (pure copper-type) with a thickness of 20 μm was subjected to electrodeposition treatment at 2 A/dm² in a 500 g/dm³ aqueous solution of nickel sulfamate (contains 30 g/dm³ boric acid, 30 g/dm³ nickel chloride) for 10 seconds at 40° C., washed in water, and dried. The Kocour dissolution test of the surface of this electrodeposited copper foil showed that a Ni layer with a thickness of about 0.01 μm was formed.

(Cathode Active Material Layer)

The cathode active material was prepared by the same method as that of Example 3-1.

(Anode Active Material Layer)

The anode active material was prepared by the same method as that of Example 3-1.

(Preparation of All-Solid-State Secondary Battery)

The all-solid-state secondary battery was formed by the same method as that of Example 3-1.

Example 3-7

Preparation of Solid Electrolyte

The all-solid-state secondary battery was formed by the same method as that of Example 3-1.

(Anode Current Collector: Formation of Sulfidation Resistant Metal Layer)

An electrolytic copper foil (pure copper-type) with a thickness of 20 μm was subjected to electrodeposition treatment at 10 A/dm² in a 500 g/dm³ aqueous solution of nickel sulfamate (contains 30 g/dm³ boric acid, 30 g/dm³ nickel chloride) for 400 seconds at 40° C., washed in water, and dried. The Kocour dissolution test of the surface of this electrodeposited copper foil showed that a Ni layer with a thickness of about 5 μm was formed.

(Cathode Active Material Layer)

The cathode active material was prepared by the same method as that of Example 3-1.

(Anode Active Material Layer)

The anode active material was prepared by the same method as that of Example 3-1.

(Preparation of All-Solid-State Secondary Battery)

The all-solid-state secondary battery was formed by the same method as that of Example 3-1.

Example 3-8

Preparation of Solid Electrolyte

The solid electrolyte was formed by the same method as that of Example 3-1.

(Anode Current Collector: Formation of Sulfidation Resistant Metal Layer)

An electrolytic copper foil (pure copper-type) with a thickness of 20 μm was subjected to electrodeposition treatment at 3 A/dm² in a 250 g/dm³ aqueous solution of tin sulfate for 15 seconds in room temperature, washed in water, and dried by heating at 100° C. The Kocour dissolution test of the surface of this electrodeposited copper foil showed that a Sn layer with a thickness of about 0.2 μm was formed. Further, SEM observation and EPMA analysis of the surface indicated that Sn diffused into and formed an alloy with the copper substrate. Furthermore, the present electrodeposited copper foil was subjected to electrodeposition treatment at 10 A/dm² in a 500 g/dm³ aqueous solution of nickel sulfamate (containing 30 g/dm³ boric acid, 30 g/dm³ nickel chloride) for 150 seconds at 40° C., washed in water, and dried. The Kocour dissolution test of the surface of this electrodeposited copper foil showed that a Ni layer with a thickness of about 2 μm was formed. That is, a Sn diffusion alloy layer was formed as the first layer and a Ni layer was formed above it as a second layer.

(Cathode Active Material Layer)

The cathode active material was prepared by the same method as that of Example 3-1.

(Anode Active Material Layer)

The anode active material was prepared by the same method as that of Example 3-1.

(Preparation of All-Solid-State Secondary Battery)

The all-solid-state secondary battery was formed by the same method as that of Example 3-1.

Example 3-9

Preparation of Solid Electrolyte

As raw materials for the solid electrolyte, $Li_2S$ and $P_2S_5$ were mixed in a mortar in a glove box under Ar atmosphere, after which the mixture was enclosed in a Zr pot with Zr balls, subjected to 20 hours of MM treatment at 500 rpm in room temperature by a planetary-type ball mill, to thereby obtain amorphous particulates of $70Li_2S$-$30P_2S_5$. Differential thermal analysis showed an exothermic peak at 200° C., indicating that it undergoes crystallization. The sample was crystallized by subjecting to 2 hours of heat treatment and pelletized, a carbon (paste) electrode was formed, and the conductivity was measured by the AC impedance method. As a result, a high value of $10^{-3}$ S/cm was obtained and the present material was found to show high Li ion conductivity.

(Anode Current Collector: Formation of Sulfidation Resistant Metal Layer)

An electrolytic copper foil (pure copper-type) with a thickness of 20 μm was subjected to electrodeposition treatment at 10 $A/dm^2$ in a 500 $g/dm^3$ aqueous solution of nickel sulfamate (containing 30 $g/dm^3$ boric acid, 30 $g/dm^3$ nickel chloride) for 150 seconds at 40° C., washed in water, and dried. The Kocour dissolution test of the surface of this electrodeposited copper foil showed that a Ni layer with a thickness of about 2 μm was formed.

(Cathode Active Material Layer)

The cathode active material was prepared by the same method as that of Example 1-1.

(Anode Active Material Layer)

The anode active material was prepared by the same method as that of Example 1-1.

(Preparation of all-Solid-State Secondary Battery)

The all-solid-state secondary battery was formed by the same method as that of Example 1-1.

Example 4-1

Preparation of Solid Electrolyte

The solid electrolyte was formed by the same method as that of Example 3-1.

(Anode Current Collector: Formation of Copper Electrodeposition Layer)

An electrolytic copper foil (pure copper-type) with a thickness of 20 μm was subjected to electrodeposition treatment at 20 $A/dm^2$ while immersing in an aqueous solution with 50 $g/dm^3$ of copper and sulfuric acid with 1 $g/dm^3$ of sodium molybdate for 15 seconds at 40° C., washed in water, and dried. The depth profile analysis by AES of this Mo-containing-copper electrodeposited copper foil showed that Mo was indeed detected on 0.5 μm of the surface layer, along with the Cu matrix.

(Cathode Active Material Layer)

The cathode active material was prepared by the same method as that of Example 1-1.

(Anode Active Material Layer)

The anode active material was prepared by the same method as that of Example 1-1.

(Preparation of All-Solid-State Secondary Battery)

The cathode integrated layer and the solid electrolyte layer were each pelletized by pressing at 2 $t/cm^3$ and 1 $t/cm^3$, each. As the anode active material, an anode active material layer containing artificial graphite and a binder was coated on the aforementioned electrodeposited copper foil by known methods. Subsequently, press integration molding was once again performed at 1 $t/cm^3$ in the composition of cathode current collector/cathode active material layer/solid electrolyte layer/anode active material layer/anode current collector

Example 4-2

Preparation of Solid Electrolyte

Amorphous particulates were obtained under the same conditions as those of Example 4-1, other than using $Li_2S$ and $P_2S_5$ and $P_2O_5$ in a ratio for obtaining a $70Li_2S$-$20P_2S_5$-$10P_2O_5$ composition. From the results of differential thermal analysis, the crystallized sample obtained by heating at 300° C. for 2 hours was pelletized, and its ion conductivity was measured, which was found to be about $10^{-3}$ S/cm.

(Anode Current Collector: Formation of Copper Electrodeposition Layer)

An electrolytic copper foil (pure copper-type) with a thickness of 20 μm was subjected to electrodeposition treatment at a current density of 5 $A/dm^2$ while immersing in an aqueous solution with 50 $g/dm^3$ of copper and 75 $g/dm^3$ of sulfuric acid with 1 $g/dm^3$ of sodium tungstate for 30 seconds at 40° C., washed in water, and dried. The depth profile analysis by AES of this W-containing-copper electrodeposited copper foil showed that W was indeed detected on 0.5 μm of the surface layer, along with the Cu matrix.

(Cathode Active Material Layer)

For the cathode active material layer, a composite layer of $Mo_6S_8$, and a synthesized and crystallized solid electrolyte, $70Li_2S$-$20P_2S_5$-$10P_2O_5$, and acetylene black mixed in a ratio of 40:55:5 was used. $Mo_6S_8$ was obtained by subjecting $Cu_2Mo_6S_8$ to a reduction treatment by an acid aqueous solution.

(Anode Active Material Layer)

The anode active material was prepared by the same method as that of Example 4-1.

(Preparation of All-Solid-State Secondary Battery)

The all-solid-state secondary battery was prepared by the same method as that of Example 4-1.

Example 4-3

Preparation of Solid Electrolyte

The solid electrolyte was formed by the same method as that of Example 4-2.

(Anode Current Collector: Formation of Copper Electrodeposition Layer)

The anode current collector was prepared by the same method as that of Example 4-2.

(Cathode Active Material Layer)

The cathode current collector was prepared by the same method as that of Example 4-2.

(Anode Active Material Layer)

For the anode active material layer, a composite layer of $Sn_4P_3$, and a synthesized and crystallized solid electrolyte, $70Li_2S$-$20P_2S_5$-$10P_2O_5$, and acetylene black mixed in a ratio of 50:45:5 was used. $Sn_4P_3$ was synthesized by subjecting Sn and phosphorus to MM treatment in a ball mill at 300 rpm for 3 hours to obtain the composition ratio.

(Preparation of All-Solid-State Secondary Battery)

The all-solid-state secondary battery was prepared by the same method as that of Example 4-2.

Example 4-4

Preparation of Solid Electrolyte

The solid electrolyte was formed by the same method as that of Example 4-3.

(Anode Current Collector: Formation of Copper Electrodeposition Layer)

The anode current collector was prepared by the same method as that of Example 4-3.

(Cathode Active Material Layer)

For the cathode active material layer, a composite layer of sulfur powder, a synthesized and crystallized solid electrolyte, $70Li_2S$-$20P_2S_5$-$10P_2O_5$, and acetylene black mixed in a ratio of 30:60:10 was used.

(Anode Active Material Layer)

The anode current collector was prepared by the same method as that of Example 4-3.

(Preparation of All-solid-state Secondary Battery)

The all-solid-state secondary battery was prepared by the same method as that of Example 4-3.

Example 4-5

Preparation of Solid Electrolyte

The solid electrolyte was formed by the same method as that of Example 4-1.

(Anode Current Collector: Formation of Copper Electrodeposition Layer)

An electrolytic copper foil (pure copper-type) with a thickness of 20 μm was subjected to electrodeposition treatment at a current density of 2 A/dm$^2$ while immersing in an aqueous solution with 50 g/dm$^3$ of copper and sulfuric acid with 1 g/dm$^3$ of sodium molybdate for 5 seconds at 40° C., washed in water, and dried. The depth profile analysis by AES of this Mo-containing-copper electrodeposited copper foil showed that Mo was indeed detected on 0.1 μm of the surface layer, along with the Cu matrix.

(Cathode Active Material Layer)

The cathode active material layer was prepared by the same method as that of Example 4-1.

(Anode Active Material Layer)

The active material layer was prepared by the same method as that of Example 4-1.

(Preparation of All-Solid-State Secondary Battery)

The all-solid-state secondary battery was prepared by the same method as that of Example 4-1.

Example 4-6

Preparation of Solid Electrolyte

The solid electrolyte was formed by the same method as that of Example 4-1.

(Anode Current Collector: Formation of Copper Electrodeposition Layer)

An electrolytic copper foil (pure copper-type) with a thickness of 20 μm was subjected to electrodeposition treatment at a current density of 2 A/dm$^2$ while immersing in an aqueous solution with 50 g/dm$^3$ of copper and sulfuric acid with 1 g/dm$^3$ of sodium molybdate for 70 seconds at 40° C., washed in water, and dried. The depth profile analysis by AES of this Mo-containing-copper electrodeposited copper foil showed that Mo was indeed detected on 2.5 μm of the surface layer, along with the Cu matrix.

(Cathode Active Material Layer)

The cathode active material was prepared by the same method as that of Example 4-1.

(Anode Active Material Layer)

The anode active material layer was prepared by the same method as that of Example 4-1.

(Preparation of All-Solid-State Secondary Battery)

The all-solid-state secondary battery was prepared by the same method as that of Example 4-1.

Comparative Example 1

Other than using a standard electrolytic copper foil that is not subjected to sulfurization treatment, oxidization treatment, or electrodeposition treatment as an anode current collector, the same preparation process as that of Example 1-1 was used.

Comparative Example 2

Other than using a standard electrolytic copper foil for batteries that is not subjected to electrodeposition treatment as an anode current collector, the same preparation process as that of Example 4-1 was used.

Comparative Example 3

Other than using a standard electrolytic copper foil for printed circuits that is not subjected to electrodeposition layer formation as an anode current collector, the same preparation process as that of Example 4-1 was used.

[Evaluation]

(Evaluation of Appearance)

The anode current collector was dismantled inside a glove box after the charge-discharge test, and the condition of its surface was observed. Further, for Examples 4-1 to 4-6, and Comparative Examples 2 to 3, the condition of the anode current collector after press integration molding was observed by sight.

(Charge-Discharge Test)

The all-solid-state secondary battery was subjected to 100 cycles of charge-discharge at a rate of 0.5 C.

(Measurement of Surface Compressive Strength and Surface Compressive Elastic Modulus)

For Example 4-1 to 4-6 and Comparative Example 2 to 3, the surface compressive strength and the surface compressive elastic modulus of the copper foils for anode current collector were obtained as the average of ten points of the electrodeposition surface using a nano-indentation tester (ENT-1100a, product of Elionix Inc.) at a load condition of 50 mN.

TABLE 1

|  | Example 1-1 | Example 1-2 | Example 1-3 | Example 1-4 | Example 1-5 | Example 1-6 |
|---|---|---|---|---|---|---|
| Observation of anode and current collector after test | Uniformly black appearance | Uniformly black appearance | Uniformly black appearance | Uniformly black appearance | Uniformly black appearance | Uniformly black appearance |
| First discharge capacity (mAh/cm$^2$) | 1 | 1.25 | 3 | 6 | 1.05 | 0.95 |
| Discharge capacity after 100 cycles (mAh/cm$^2$) | 0.6 | 0.9 | 2.5 | 5.4 | 0.58 | 0.55 |
| Discharge capacity maintenance rate (%) | 60 | 72 | 83 | 90 | 55 | 58 |

TABLE 2

|  | Example 2-1 | Example 2-2 | Example 2-3 | Example 2-4 | Example 2-5 | Example 2-6 |
|---|---|---|---|---|---|---|
| Observation of anode and current collector after test | Uniformly black appearance | Uniformly black appearance | Uniformly black appearance | Uniformly black appearance | Uniformly black appearance | Uniformly black appearance |
| First discharge capacity (mAh/cm$^2$) | 1.05 | 1.2 | 2.9 | 6.3 | 1.15 | 0.9 |
| Discharge capacity after 100 cycles (mAh/cm$^2$) | 0.65 | 0.9 | 2.4 | 5.7 | 0.7 | 0.58 |
| Discharge capacity maintenance rate (%) | 62 | 75 | 83 | 90 | 61 | 59 |

TABLE 3

|  | Example 3-1 | Example 3-2 | Example 3-3 | Example 3-4 | Example 3-5 | Example 3-6 | Example 3-7 | Example 3-8 | Example 3-9 |
|---|---|---|---|---|---|---|---|---|---|
| Observation of anode and current collector after test | Uniform appearance | Uniform appearance | Uniform appearance | Uniform appearance | Uniform appearance | Uniform appearance | Uniform appearance | Uniform appearance | Uniform appearance |
| First discharge capacity (mAh/cm$^2$) | 0.95 | 1.2 | 3.2 | 6.2 | 1.3 | 0.9 | 1.1 | 1.05 | 1.05 |
| Discharge capacity after 100 cycles (mAh/cm$^2$) | 0.6 | 0.9 | 2.6 | 5.5 | 0.95 | 0.55 | 0.9 | 0.85 | 0.8 |
| Discharge capacity maintenance rate (%) | 63 | 75 | 81 | 89 | 73 | 61 | 82 | 81 | 7.6 |

TABLE 4

|  | Example 4-1 | Example 4-2 | Example 4-3 | Example 4-4 | Example 4-5 | Example 4-6 |
|---|---|---|---|---|---|---|
| Compressive strength of surface (MPa) | 1,505 | 2,341 | 2,341 | 2,341 | 1,156 | 3,470 |
| Compressive elastic modulus of surface (GPa) | 40.5 | 91.7 | 91.7 | 91.7 | 35.8 | 105 |
| Observation of anode current collector copper foil after press | Uniform appearance | Uniform appearance | Uniform appearance | Uniform appearance | Uniform appearance | Uniform appearance |
| Observation of anode and current collector after test | Normal appearance | Normal appearance | Normal appearance | Normal appearance | Normal appearance | Normal appearance |
| First discharge capacity (mAh/cm$^2$) | 1 | 1.2 | 2.8 | 5.9 | 1.1 | 0.9 |

TABLE 4-continued

|  | Example 4-1 | Example 4-2 | Example 4-3 | Example 4-4 | Example 4-5 | Example 4-6 |
|---|---|---|---|---|---|---|
| Discharge capacity after 100 cycles (mAh/cm$^2$) | 0.6 | 0.85 | 2.3 | 5.5 | 0.6 | 0.6 |
| Discharge capacity maintenance rate (%) | 60 | 71 | 82 | 93 | 55 | 67 |

TABLE 5

|  | Comparative Example 1 | Comparative Example 2 | Comparative Example 3 |
|---|---|---|---|
| Compressive strength of surface (MPa) | — | 1,041 | 784 |
| Compressive elastic modulus of surface (GPa) | — | 49 | 36 |
| Observation of anode current collector copper foil after press | — | Partial rupture | Partial rupture |
| Observation of anode and current collector after test | Pit-like roughness and dark-brown spots | Electrode peeling, copper foil wrinkles | Electrode peeling, copper foil wrinkles |
| First discharge capacity (mAh/cm$^2$) | 0.8 | 0.55 | 0.45 |
| Discharge capacity after 100 cycles (mAh/cm$^2$) | 0.2 | (30 cycles) 0.15 | (20 cyces) 0.1 |
| Discharge capacity maintenance rate (%) | 25 | Life span ended midway (0.09) | Life span ended midway (0.07) |

From Table 1 to Table 4, no apparent change and problems were seen in the current collector copper foil for Examples 1-1 to 4-6, and thus, normal and good charge-discharge characteristics were indicated. On the other hand, in Comparative Example 1, pit-like corrosions were seen on the current collector copper foil, indicating that corrosion was caused by contact with the sulfide solid electrolyte. For this reason, large degradation in the charge-discharge characteristic was seen, compared to those of Examples 1-1 to 4-6. Note that similar results were seen for Examples 3-1 to 9, wherein Zn, Ni, Sn were used as the material elements for the sulfidation resistant metal layers. From Examples 3-5 and 3-7, favorable charge-discharge characteristics were obtained when the thickness of the layers were 2 to 5 μm. Further, in Examples 4-1 to 6, wherein copper electrodeposition layers containing Mo and W were used as the sulfidation resistant layers, similar results were obtained regardless of Mo and W. Further, in Comparative Examples 2 and 3, because the anode current collectors were partly ruptured after pressing, life ended after 30 or 20 cycles in the charge-discharge test, and sufficient cycle characteristics could not be obtained.

Note that in Examples 1-1 to 1-6, Examples 2-1 to 2-6, Examples 3-1 to 3-9, and Examples 4-1 to 4-6, by changing the type of cathode active materials and anode active materials, the charge-discharge capacity of the all-solid-state battery increased depending on the specific capacity of the cathode and anode active materials. Thus, it was confirmed that large specific energy and good cycle characteristics could be obtained compared to conventional Li-ion batteries that utilize organic electrolyte solutions.

Although embodiments of the present invention have been described in detail above with reference to the accompanying figures, the present invention is not limited to such embodiments. It should be obvious to those in the field that examples of various changes and modifications are included within the realm of the technical idea of the present invention, and it should be understood that such examples are included in the technical scope of the present invention.

The invention claimed is:

1. An all-solid-state secondary battery, comprising:
    an anode current collector comprising a substrate that contains copper or copper alloy and a sulfidation resistant metal layer having a thickness of 0.01 to 5 μm on the substrate;
    an anode active material layer comprising an anode active material and a sulfide solid electrolyte containing a monovalent or divalent metal and sulfur, on the anode current collector;
    a solid electrolyte layer consisting essentially of the sulfide solid electrolyte that contains the monovalent or divalent metal and the sulfur, on the anode active material layer;
    a cathode active material layer on the solid electrolyte layer; and
    a cathode current collector comprising aluminum, aluminum alloy or stainless steel, on the cathode active material layer,
    wherein the sulfidation resistant metal layer is at least one layer selected from the group consisting of nickel, zinc, nickel alloy containing nickel and other metals than zinc and tin, and zinc alloy containing zinc and other metals than nickel and tin.

2. The all-solid-state secondary battery according to claim 1, wherein the zinc in the sulfidation resistant metal layer undergoes diffusion alloying with the copper in the anode current collector to form a diffusion alloying layer.

3. The all-solid-state secondary battery according to claim 2, wherein the sulfidation resistant metal layer further comprises a nickel layer on top of the diffusion alloying layer.

* * * * *